United States Patent
Park et al.

(10) Patent No.: US 8,578,488 B2
(45) Date of Patent: Nov. 5, 2013

(54) METHOD FOR NEUTRALIZING THE ARP SPOOFING ATTACK BY USING COUNTERFEIT MAC ADDRESSES

(75) Inventors: Hyoung-Bae Park, Seoul (KR); Yun-Seok Lee, Seoul (KR); Kyu-Min Choi, Seoul (KR); Kyoung-Pil Kong, Seoul (KR); Pil-Sang You, Seoul (KR); Sung-Goo Kim, Seoul (KR)

(73) Assignee: Plustech Inc., Seoul (KR)

( * ) Notice: Subject to any disclaimer, the term of this patent is extended or adjusted under 35 U.S.C. 154(b) by 231 days.

(21) Appl. No.: 13/121,809

(22) PCT Filed: Nov. 18, 2008

(86) PCT No.: PCT/KR2008/006793
§ 371 (c)(1),
(2), (4) Date: Mar. 30, 2011

(87) PCT Pub. No.: WO2010/041788
PCT Pub. Date: Apr. 15, 2010

(65) Prior Publication Data
US 2011/0179486 A1  Jul. 21, 2011

(30) Foreign Application Priority Data

Oct. 10, 2008 (KR) .................. 10-2008-0099850
Nov. 18, 2008 (KR) .................. 10-2008-0114440

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ........................................... 726/22

(58) Field of Classification Search
USPC ........................................ 726/22, 23
See application file for complete search history.

(56) References Cited

U.S. PATENT DOCUMENTS

| | | | |
|---|---|---|---|
| 7,234,163 B1 | 6/2007 | Rayes et al. | |
| 7,346,057 B2 | 3/2008 | Foschiano et al. | |
| 7,360,245 B1* | 4/2008 | Ramachandran et al. | 726/13 |
| 7,756,140 B2* | 7/2010 | Matoba | 370/395.54 |
| 2005/0050365 A1* | 3/2005 | Seki et al. | 713/201 |

* cited by examiner

*Primary Examiner* — Kambiz Zand
*Assistant Examiner* — Dant Shaifer Harriman
(74) *Attorney, Agent, or Firm* — Birch, Stewart, Kolasch & Birch, LLP (57) ABSTRACT

The present invention is related to a method for neutralizing a malicious ARP spoofing attack generated in a local network and in particular, the present invention provides a method for neutralizing an ARP spoofing attack comprising a step for detecting an ARP spoofing attack based on an ARP request packet generated for an ARP spoofing attack; a step for generating a plurality of counterfeit MAC addresses and dynamically changing MAC addresses of network devices or servers which are to be protected whenever an ARP spoofing attack is generated; and a step for neutralizing an ARP spoofing attack by using a counterfeit MAC address which is capable of neutralizing an ARP spoofing attack adequately.

10 Claims, 7 Drawing Sheets

| Real MAC address of equipments | Counterfeit MAC address | Equipment IP | Current use state |
|---|---|---|---|
| 00-01-02-03-04-AA | AA-00-01-02-03-04-01 | 192.168.0.1 | used |
| 00-01-02-03-04-AA | AA-00-01-02-03-04-02 | 192.168.0.1 | not used |
| 00-01-02-03-04-AA | AA-00-01-02-03-04-03 | 192.168.0.1 | used |
| 00-01-02-03-04-BB | BB-00-01-02-03-04-01 | 192.168.0.2 | used |
| 00-01-02-03-04-BB | BB-00-01-02-03-04-02 | 192.168.0.2 | not used |
| 00-01-02-03-04-BB | BB-00-01-02-03-04-03 | 192.168.0.2 | not used |
| ⋮ | ⋮ | ⋮ | ⋮ |

METHOD FOR NEUTRALIZING THE ARP SPOOFING ATTACK BY USING COUNTERFEIT MAC ADDRESSES

TECHNICAL FIELD

The present invention relates to a method for detecting and neutralizing an ARP spoofing attack and in particular, relates to a method using a counterfeit MAC address for neutralizing an ARP spoofing attack, wherein consists of a step for detecting an ARP spoofing attack by collecting an ARP request packet transmitted for forging a MAC address when a hacker forges the MAC address of a attack target identically and then counterfeits information of an ARP cache table of a switch or a other network devices in order to execute an ARP spoofing attack, and a step for changing the MAC address of the attack target into a counterfeit MAC address if an ARP spoofing attack is detected so that an ARP spoofing attack can be neutralized.

BACKGROUND ART

Recently, an Internet technology is developing remarkably without let-up and is being disseminated widely, anyone can use the Internet easily.

Thus, Internet users have been increasing tremendously, but all of Internet users do not necessarily know technology about computer systems or networks very well.

That is, Internet users are increasing incessantly due to spread of Internet use, but since they do not always have special knowledge about a computer or the Internet, the wicked persons who execute various kinds of crimes via a network using this drawback are increasing bit by bit.

For example, consider a case such as an individual information theft which is drawing keen attention of the citizens recently intensively. In the past, most users using the Internet have a tendency that they ignore or disregard importance of individual information or security, and thus they have been thinking little of importance. But, as various kinds of crimes are generated using such a way of thinking, awareness of network security is being enhanced and thus, as described above, a method to prevent illegal hacking and the like is drawing keen attention of the concerned persons.

Further, as described above, there are many hacking ways as a method to acquire individual information illegally, but a hacking method using an ARP spoofing attack can be enumerated as an example.

An ARP spoofing attack is as follows. A hacker forges the MAC address of a attack target identically and then counterfeits information of an ARP cache table of a switch or a other network devices. As a result, the attacker can obtain desired information from the routed traffic by routing traffic between a computer that is the attack target and a server to a attacker's computer.

In this way, if a hacker forges information of an ARP cache table of a switch or other network devices via an ARP spoofing attack, the hacker can route traffic between a computer that is the attack target and a server to his own computer, and thereby, the attacker can obtain very useful individual information such as a password and etc. from the routed traffic without restriction.

Therefore, as Internet users are increasing explosively, such an ARP spoofing attack becomes a very serious problem in light of a situation that diverse equipments are employed for establishing a network in enterprises, individuals and even homes.

A conventional method for neutralizing this malicious ARP spoofing attack is follows. If many IPs having same MAC address are spotted by scanning an ARP table of same local network equipments, there is a room for doubt that an ARP spoofing attack is generated and first of all, it is confirmed whether an execution file including vicious code for an ARP spoofing attack exists or is being executed in a suspicious equipment for which an ARP spoofing attack is generated. After detecting whether an ARP spoofing attack is generated or not, an ARP spoofing attack is blocked through deletion of a concerned execution file and execution stop of a process.

In this way, after confirming whether an execution file including malicious codes for an ARP spoofing attack exists or is being executed in a suspicious equipment for which an ARP spoofing attack is generated, an ARP spoofing attack is blocked temporarily through deletion of a concerned execution file and execution stop of a process, but such a method is only a temporary way of blocking.

That is, as malicious codes and concerned execution file names are changed and evolved, the conventional method described as above can not be free from an ARP spoofing attack and there is an ineffective problem that all equipments for which there is a suspicion that an ARP spoofing attack is generated must be checked one by one.

Further, this problem is getting more serious as suspicious equipments are increasing, that is, a scale of a network is being enlarged.

Therefore, under a present situation that a scale of a network is being enlarged and so numerous network equipments are used, there are immense efforts and time for checking all equipments for which there is a suspicion that an ARP spoofing attack is generated one by one, and personnel expenses and other costs are also increased when personnel is increased in order to reduce the checking time. As a result, there exist many problems in terms of time and cost as well as spoofing damage.

Therefore, in order to solve the above conventional problems, it is desirable to provide a method for neutralizing an ARP spoofing attack swiftly and effectively, but a method which satisfies those conditions has not been developed until now.

DISCLOSURE

Technical Problem

Therefore, in order to solve a conventional problem that can not neutralize effectively an ARP spoofing attack which is evolving and changing continuously, the object of the present invention is to provide a method comprising a step for detecting an ARP spoofing attack in a real time manner, a step for initially neutralizing an ARP spoofing attack by changing a MAC address of an equipment which is a target of an ARP spoofing attack into a counterfeit MAC address after detection and a step for neutralizing an ARP spoofing attack using the counterfeit MAC address for initially neutralizing an ARP spoofing attack which is evolving and changing continuously.

Further, in order to improve inefficiency of a prior art which must check equipments having a room for doubt that an ARP spoofing attack is generated one by one, another object of the present invention is to provide a method comprising a step for detecting an ARP spoofing attack in a real time manner, a step for initially neutralizing an ARP spoofing attack by changing a MAC address of an equipment which is a target of an ARP spoofing attack into a counterfeit MAC address after detection and a step for neutralizing an ARP spoofing attack using more effective counterfeit MAC address in terms of time and cost without checking equipments having a room for doubt that an ARP spoofing attack is generated one by one.

Technical Solution

In order to accomplish the above objects, a system for neutralizing an ARP spoofing attack according to the present invention is provided and the system consists of a local network including a general network device such as a subscriber PC, terminal equipments and a switch; a network for neutralizing an ARP spoofing attack and including a network device such as a router, terminal equipments, a server and a switch; and a means for neutralizing an ARP spoofing attack which is connected between the switch of the local network, and the switch of a network for neutralizing an ARP spoofing attack so that all traffics can be bypassed in case of communications between the above networks.

Here, the means for neutralizing an ARP spoofing attack includes a means for detecting an ARP spoofing attack against the network device or the server, and which is connected between the local network and the network for neutralizing a ARP spoofing attack so that all kinds of packets generated or received by a subscriber of the local network can pass through; a MAC address conversion table having a real MAC address of an equipment, and a plurality of counterfeit MAC addresses corresponding to the real MAC address of the equipment in order to change a MAC address of a network device or a MAC address of a server which is to be protected from an ARP spoofing attack into a counterfeit address; and a transmission unit for transmitting all of transmitted and received packets to the counterfeit MAC address via the local network.

Further, the means for detecting an ARP spoofing attack recognizes a fact that an ARP attack is generated if an ARP request packet in which a MAC address of a transmitter is identical to the MAC address of the network device or the MAC address of the server is collected among all ARP request packets collected via a network interface connected to the local network, and changes a MAC address which is currently being used into a counterfeit MAC address which is not used based on the MAC address conversion table.

Further, a system for neutralizing an ARP spoofing attack according to the present invention is provided and the system includes a local network including a general network device such as a subscriber PC, terminal equipments and a switch; and a terminal device for neutralizing an ARP spoofing attack which is connected to the local network, and where a software for neutralizing an ARP spoofing attack is embedded so that all traffics transmitted and received among the local network can be bypassed.

Here, the software for neutralizing an ARP spoofing attack executes a step for detecting an ARP spoofing attack which is executed against the terminal device for neutralizing an ARP spoofing attack by each of subscriber PCs and the like of the local network, and wherein the terminal device is connected to the local network so that all kinds of packets generated or received between the terminal device for neutralizing an ARP spoofing attack and a subscriber of the local network can pass through; a step for changing a MAC address of the terminal device for neutralizing an ARP spoofing attack which is currently being used into a counterfeit MAC address which is not used based on a MAC address conversion table having a real MAC address of an equipment, and a plurality of counterfeit MAC addresses corresponding to the real MAC address of the equipment in order to change the MAC address of the terminal device for neutralizing an ARP spoofing attack which is to be protected from an ARP spoofing attack into a counterfeit address if it is judged that an ARP attack is generated in the step for detecting an ARP spoofing attack; and a step for transmitting all of transmitted and received packets to the counterfeit MAC address via the local network.

Further, the step for detecting an ARP spoofing attack recognizes a fact that an ARP attack is generated if an ARP request packet in which the MAC address of the terminal device for neutralizing an ARP spoofing attack is identical to the MAC address of a transmitter is collected among all ARP request packets collected via a network interface connected to the local network.

Further, a method for neutralizing an ARP spoofing attack according to the present invention is provided and the method consists of a step for allocating a counterfeit MAC address to a network device or a terminal device for neutralizing an ARP spoofing attack; a step for monitoring whether an ARP spoofing attack is executed by monitoring an ARP request packet or not; a step for changing the counterfeit MAC address of an detected attack target if an attack is detected at the monitoring step; a step for notifying network devices and terminal devices on all local networks of the changed counterfeit MAC address; and a step for changing MAC addresses of all reception and transmission packets into the changed counterfeit MAC address and executing communications.

Here, the step for monitoring whether an ARP spoofing attack is executed by monitoring an ARP request packet or not includes a step for filtering and collecting only ARP request packets for which an OP code value is 1 among packets received from the local networks; and a step for judging whether a MAC address which is identical to a Sender MAC address of a header information of the ARP request packet exists in the counterfeit MAC addresses or not, and if it exits, judging that a spoofing attack for a concerned MAC address exists since an ARP request packet is regarded as an ARP request packet generated in a real network device or a server but an ARP request packet from a specific terminal of a network for counterfeiting an ARP cache table for a switch or other network devices.

Further, the step for changing the counterfeit MAC address selects a counterfeit MAC address that is not currently used for changing the counterfeit MAC address for which an attack is detected into the counterfeit MAC address that is not currently used based on the MAC address conversion table having a real MAC address of a equipment, and a plurality of counterfeit MAC addresses corresponding to the real MAC address of the equipment if the attack is detected.

Further, the step for notifying network devices and terminal devices generates an ARP request packet indicating that the counterfeit MAC address which is attacked is changed, and transmits it to the network devices and the terminal devices on all local networks of the changed counterfeit MAC address transmits in a broadcasting manner.

Further, the communication step includes a step for changing a receiver MAC of a packet transmitted to the network devices or the terminal devices into a real MAC address of the network devices and the terminal devices which are ready to receive based on the MAC conversion table so that the network devices or the terminal devices can communicate to the changed counterfeit MAC address; and a step for changing a transmitter MAC of a packet transmitted from the network devices or the terminal devices into a counterfeit MAC address of the network devices and the terminal devices which are ready to transmit based on the MAC conversion table.

Advantageous Effects

As described above, according to the prior art, first of all, it must be confirmed whether an execution file including vicious code for an ARP spoofing attack exists or is being executed in suspicious equipment for which an ARP spoofing attack is generated. Therefore, a conventional problem can not neutralize effectively an ARP spoofing attack which is evolving and changing continuously. In order to solve this problem, the present invention can provide a method comprising a step for detecting an ARP spoofing attack in a real time manner; a step for initially neutralizing an ARP spoofing attack by changing a MAC address of an equipment which is a target of an ARP spoofing attack into a counterfeit MAC address after detection; and a step for neutralizing an ARP spoofing attack using the counterfeit MAC address for effectively neutralizing an ARP spoofing attack which is evolving and changing continuously.

Further, according to the prior art, there are immense efforts and time for checking all equipments for which there is a suspicion that an ARP spoofing attack is generated one by one, and personnel expenses and other costs are also increased when personnel is increased in order to reduce the checking time. As a result, there exist many problems in terms of time and cost as well as spoofing damage. In order to solve these problems, the present invention can provide a method comprising a step for detecting an ARP spoofing attack in a real time manner; a step for initially neutralizing an ARP spoofing attack by changing a MAC address of an equipment which is a target of an ARP spoofing attack into a counterfeit MAC address after detection; and a step for neutralizing an ARP spoofing attack using more effective counterfeit MAC address in terms of time and cost without checking equipments having a room for doubt that an ARP spoofing attack is generated one by one.

Therefore, according to the present invention, as a MAC address of an equipment for neutralizing an ARP spoofing attack is allocated and changed into a counterfeit MAC address, there is an effect that it is possible to protect concerned equipments from an ARP spoofing attack without executing any special countermeasures against an ARP spoofing attacker (for example, removal of an ARP spoofing malicious code by using a vaccine, power OFF of a attack system and etc.).

Further, a method for executing communications on a local network can be changed or improved into various security technologies on a local network by using a counterfeit MAC method of a system according to the present invention.

DESCRIPTION OF DRAWINGS

The above and other aspects, features and advantages of the present invention will be more apparent from the following detailed description taken in conjunction with the accompanying drawings, in which.

DESCRIPTION OF REFERENCE NUMBERS IN FIGURES

10. A system for neutralizing an ARP spoofing attack
11. A network for neutralizing an ARP spoofing attack
12. local network 13, 14. switch
15. A system for neutralizing an ARP spoofing attack
16. A terminal device for neutralizing an ARP spoofing attack
17. A S/W for neutralizing an ARP spoofing attack 18. interface
19. network devices and terminal devices 20. server 21. subscriber PC
31. Ethernet header 32. ARP header 41, 44. Input port
42. MAC address conversion table 43, 45. Output port

BEST MODE

According to an embodiment of the present invention, a system for neutralizing an ARP spoofing attack comprising a local network including a general network device such as a subscriber PC, terminal equipments and a switch; a network for neutralizing an ARP spoofing attack and including a network device such as a router, terminal equipments, a server and a switch; and a means for neutralizing an ARP spoofing attack which is connected between the switch of the local network, and the switch of a network for neutralizing an ARP spoofing attack so that all traffics can be bypassed in case of communications between the above networks is provided.

Here, the means for neutralizing an ARP spoofing attack includes a means for detecting an ARP spoofing attack against the network device or the server, and which is connected between the local network and the network for neutralizing a ARP spoofing attack so that all kinds of packets generated or received by a subscriber of the local network can pass through; a MAC address conversion table having a real MAC address of an equipment, and a plurality of counterfeit MAC addresses corresponding to the real MAC address of the equipment in order to change a MAC address of a network device or a MAC address of a server which is to be protected from an ARP spoofing attack into a counterfeit address; and a transmission unit for transmitting all of transmitted and received packets to the counterfeit MAC address via the local network.

Further, the means for detecting an ARP spoofing attack recognizes a fact that an ARP attack is generated if an ARP request packet in which a MAC address of a transmitter is identical to the MAC address of the network device or the MAC address of the server is collected among all ARP request packets collected via a network interface connected to the local network, and changes a MAC address which is currently being used into a counterfeit MAC address which is not used based on the MAC address conversion table.

Further, according to another embodiment of the present invention, a system for neutralizing an ARP spoofing attack is provided and the system includes a local network including a general network device such as a subscriber PC, terminal equipments and a switch; and a terminal device for neutralizing an ARP spoofing attack which is connected to the local network, and where a software for neutralizing an ARP spoofing attack is embedded so that all traffics transmitted and received among the local network can be bypassed.

Here, the software for neutralizing an ARP spoofing attack executes a step for detecting an ARP spoofing attack which is executed against the terminal device for neutralizing an ARP spoofing attack by each of subscriber PCs and the like of the local network, and wherein the terminal device is connected to the local network so that all kinds of packets generated or received between the terminal device for neutralizing an ARP spoofing attack and a subscriber of the local network can pass through; a step for changing a MAC address of the terminal device for neutralizing an ARP spoofing attack which is currently being used into a counterfeit MAC address which is not used based on a MAC address conversion table having a real MAC address of an equipment, and a plurality of counterfeit MAC addresses corresponding to the MAC address of the equipment in order to change the MAC address of the terminal device for neutralizing an ARP spoofing attack which is to be protected from an ARP spoofing attack into a counterfeit address if it is judged that an ARP attack is generated in the step for detecting an ARP spoofing attack; and a step for transmitting all of transmitted and received packets to the counterfeit MAC address via the local network.

Further, the step for detecting an ARP spoofing attack recognizes a fact that an ARP attack is generated if an ARP request packet in which the MAC address of the terminal device for neutralizing an ARP spoofing attack is identical to the MAC address of a transmitter is collected among all ARP request packets collected via a network interface connected to the local network.

Further, according to the present invention, a method for neutralizing an ARP spoofing attack is provided and the method consists of a step for allocating a counterfeit MAC address to a network device or a terminal device for neutralizing an ARP spoofing attack; a step for monitoring whether an ARP spoofing attack is executed by monitoring an ARP request packet or not; a step for changing the counterfeit MAC address of an detected attack target if an attack is detected at the monitoring step; a step for notifying network devices and terminal devices on all local networks of the changed counterfeit MAC address; and a step for changing MAC addresses of all reception and transmission packets into the changed counterfeit MAC address and executing communications.

Here, the step for monitoring whether an ARP spoofing attack is executed by monitoring an ARP request packet or not includes a step for filtering and collecting only ARP request packets for which an OP code value is 1 among packets received from the local networks; and a step for judging whether a MAC address which is identical to a Sender MAC address of a header information of the ARP request packet exists in the counterfeit MAC addresses or not, and if it exits, judging that a spoofing attack for a concerned MAC address exists since an ARP request packet is regarded as an ARP request packet generated in a real network device or a server but an ARP request packet from a specific terminal of a network for counterfeiting an ARP cache table for a switch or other network devices.

Further, the step for changing the counterfeit MAC address selects a counterfeit MAC address that is not currently used for changing the counterfeit MAC address for which an attack is detected into the counterfeit MAC address that is not currently used based on the MAC address conversion table having a MAC address of a real equipment, and a plurality of counterfeit MAC addresses corresponding to the MAC address of the real equipment if the attack is detected.

Further, the step for notifying network devices and terminal devices generates an ARP request packet indicating that the counterfeit MAC address which is attacked is changed, and transmits it to the network devices and the terminal devices on all local networks of the changed counterfeit MAC address transmits in a broadcasting manner.

Further, the communication step includes a step for changing a receiver MAC of a packet transmitted to the network devices or the terminal devices into a real MAC address of the network devices and the terminal devices which are ready to receive based on the MAC conversion table so that the network devices or the terminal devices can communicate to the changed counterfeit MAC address; and a step for changing a transmitter MAC of a packet transmitted from the network devices or the terminal devices into a counterfeit MAC address of the network devices and the terminal devices which are ready to transmit based on the MAC conversion table.

MODE FOR INVENTION

Below, a method for neutralizing an ARP spoofing attack by using a counterfeit MAC address according to the present invention will be explained in detail with referring to the attached drawings.

Here, the explanation described below is only an embodiment for realizing the present invention, and thus the present invention is not limited only to these embodiments which are described below.

Figure 1:
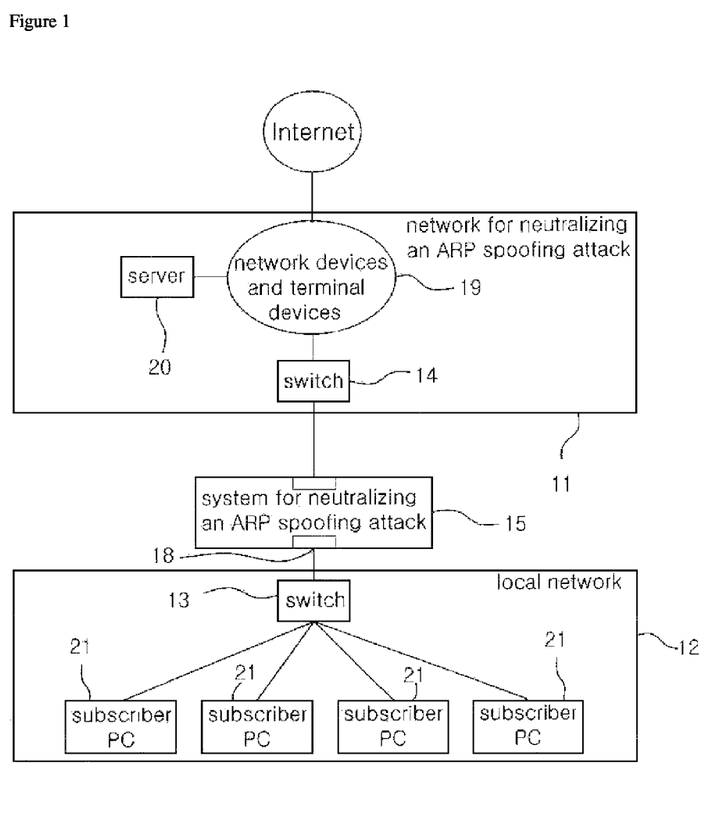
FIG. 1 is a configuration diagram of network system showing a state in which a system for neutralizing an ARP spoofing attack which executes a method for neutralizing an ARP spoofing attack by using a counterfeit MAC address is applied to a network according to a first embodiment of the present invention.

First of all, FIG. 1 is a diagram illustrating a first embodiment of the present invention and in particular, is a configuration diagram of a network system illustrating a state in which a system for neutralizing an ARP spoofing attack which executes a method for neutralizing an ARP spoofing attack by using a counterfeit MAC address according to the present invention is applied to a network.

As illustrated in FIG. 1, a network system 10 for neutralizing an ARP spoofing attack according to the present invention includes a system 15 for neutralizing an ARP spoofing attack arranged between a switch 13 of the local network and a switch 14 of a network for neutralizing an ARP spoofing attack so that all traffic of communication generated between a network 11 for neutralizing an ARP spoofing attack and a local network 12 including common network devices and terminal equipments can be bypassed.

Figure 7:
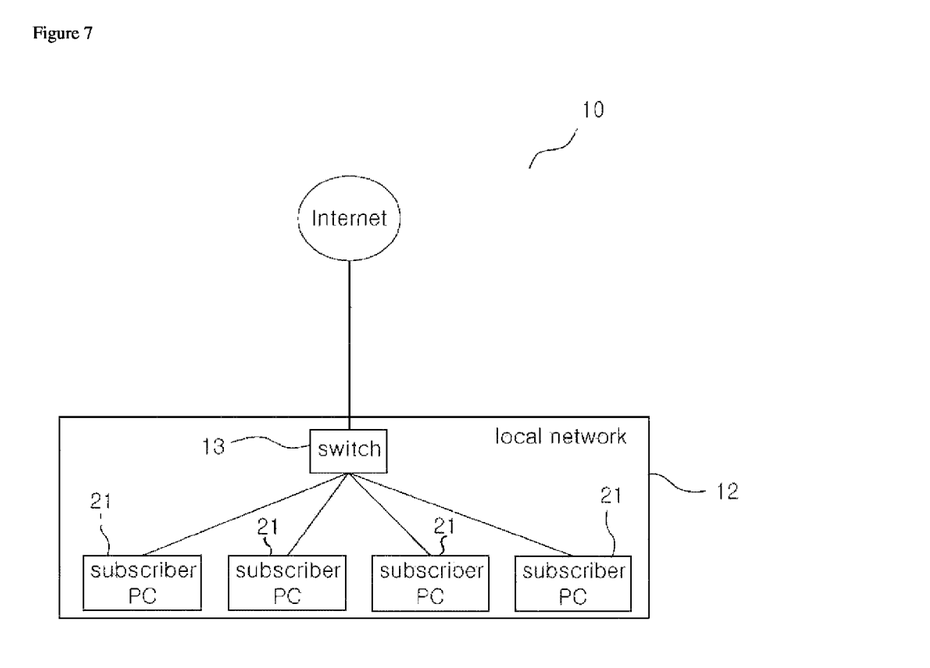
FIG. 7 is a schematic configuration diagram showing a structure of a second embodiment of a network system for neutralizing an ARP spoofing attack which executes a method for neutralizing an ARP spoofing attack by using a counterfeit MAC address according to the present invention.

Further, as illustrated in FIG. 7, a network system 10 for neutralizing an ARP spoofing attack according to the present invention includes a terminal device 16 for neutralizing an ARP spoofing attack, and a software 17 for neutralizing an ARP spoofing attack which is embedded in the terminal device 16 for enabling all traffics transmitted and received among the local network 12 to be bypassed.

Here, the structure illustrated in FIG. 7 will be explained in detail later.

Therefore, allocation of a counterfeit MAC address and a MAC address change process for neutralization of an ARP spoofing attack are executed by the system 15 for neutralizing an ARP spoofing attack in the network system as described above and the software 17 for neutralizing an ARP spoofing attack.

Figure 2:
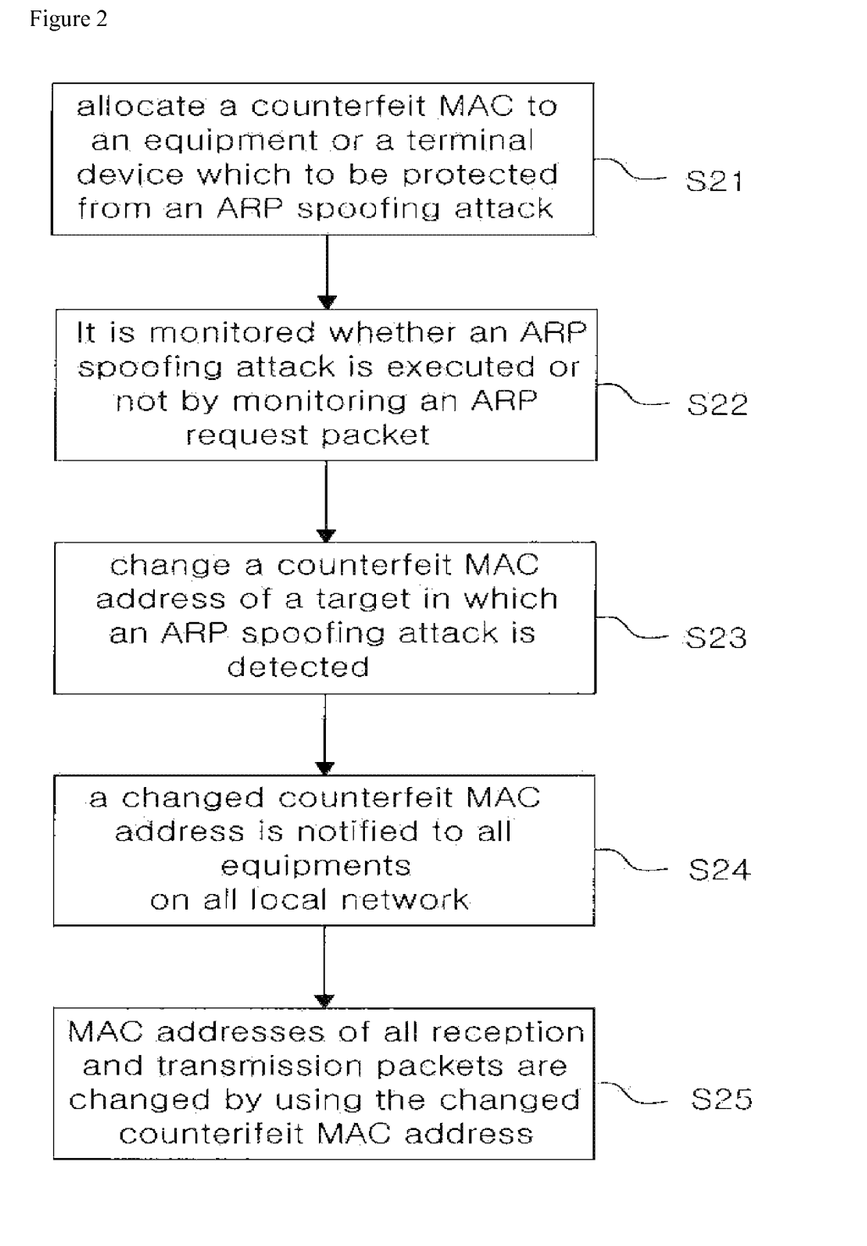
FIG. 2 is a flow chart showing whole procedures of allocation of a counterfeit MAC address and a MAC address change process for detection of an ARP spoofing attack and neutralization of an ARP spoofing attack.

FIG. 2 is a flow chart showing whole procedures of allocation of a counterfeit MAC address and a MAC address change process for detection of an ARP spoofing attack and neutralization of an ARP spoofing attack.

As illustrated in FIG. 2, first of all, a method for neutralizing an ARP spoofing attack by using a counterfeit MAC address according to the present invention allocates the counterfeit MAC address to an equipment or a terminal device which to be protected from an ARP spoofing attack (step S21).

Then, as described later, it is monitored whether an ARP spoofing attack is executed or not by monitoring an ARP request packet (step S22), and an operator changes the counterfeit MAC address if it is detected that an ARP spoofing attack is generated (step S23).

Subsequently, the changed counterfeit MAC address is notified to all equipments on all local networks (step S24) and MAC addresses of all reception and transmission packets are changed by using the changed counterfeit MAC address (step S25).

Therefore, through the above processes, it is monitored whether an ARP spoofing attack is executed or not by monitoring an ARP request packet and an ARP spoofing attack can be neutralized by changing the counterfeit MAC address if it is detected that an ARP spoofing attack is generated.

Subsequently, as described above, a method for monitoring whether an ARP spoofing attack is executed or not by monitoring an ARP request packet will be explained in detail.

A method for detecting an ARP spoofing attack according to the present invention filters and collects only ARP request packets for which an OP code value is 1 among packets transmitted from the local network 12 to an interface 18 of the system 15 for neutralizing an ARP spoofing attack.

Then, it is judged whether a MAC address which is identical to a Sender MAC address of a header information of the ARP request packet exists in the counterfeit MAC addresses of the network 11 for neutralizing an ARP spoofing attack or not. If the MAC address exits, it is judged that an ARP spoofing attack for a concerned MAC address exists since an ARP request packet is not regarded as an ARP request packet generated in a real network device 19 or a server 20 but regarded as an ARP request packet from a specific terminal of a network for counterfeiting an ARP cache table for a switch or other network devices.

In this way, if it is detected that an ARP spoofing attack is generated from the local network 12, an ARP request packet indicating that the counterfeit MAC address which is attacked is changed, and transmits it to all network equipments and the terminal devices on the local network 12 is generated and is transmitted to the local network 12 in a broadcasting manner in order to change the counterfeit MAC address for which an attack is detected into the counterfeit MAC address that is not currently used.

Figure 3:
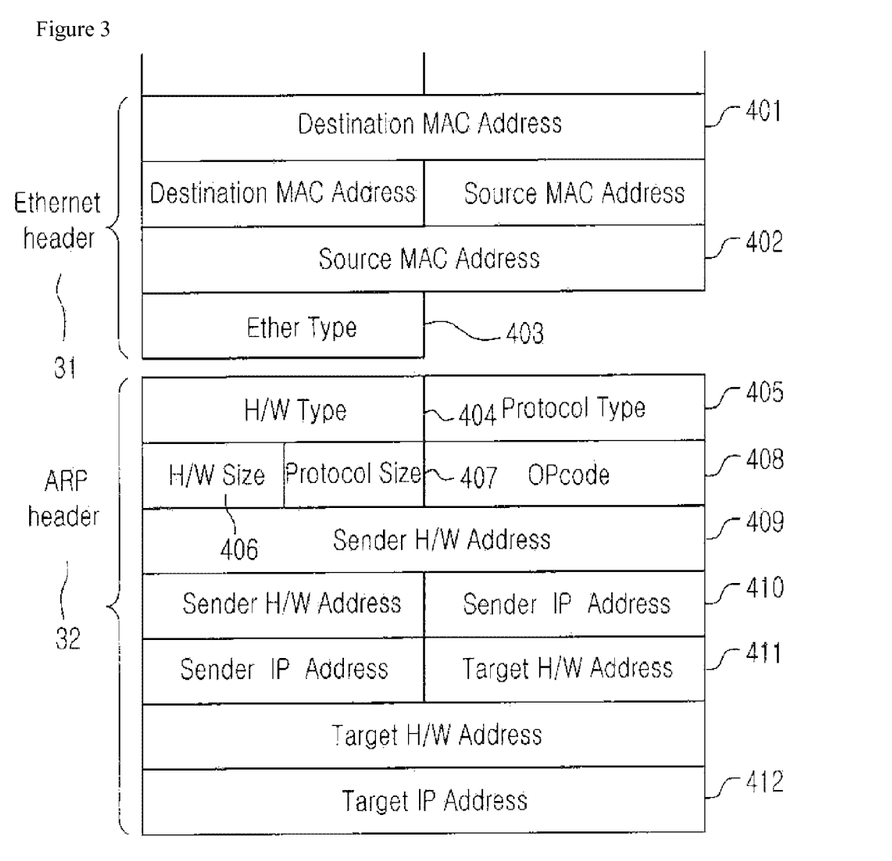
FIG. 3 is a diagram showing a structure of an ARP request packet for notifying change of a counterfeit MAC address.

As described above, FIG. 3 is a diagram showing a structure of an ARP request packet for notifying change of a counterfeit MAC address. Referring to FIG. 3, the ARP request packet includes an Ethernet header 31 and an ARP header 32, and a field information generation portion of the Ethernet header 31 is as follows.

Destination MAC Address enters 0xFFFFFFFFFFFF of broadcasting address
Source MAC Address 402 enters a counterfeit MAC address which is newly to be changed.

Ethernet Type 403 enters 0x0806 of ARP type.

Further, each field information of a field information generation portion of a ARP header is as follows.

H/W Type 404 enters 0x0001 of Ethernet type.
Protocol Type 40 enters 0x0800 which is an IP protocol.
H/W Size 406 enters 6 which is a size of Ethernet address.
Protocol Size 407 enters 4 which is a size of an IPv4 address.
OPcode 408 enters 0x0001 which is an ARP request type.
Sender Mac Address 409 enters a counterfeit MAC which is to be changed.
Sender IP Address 410 enters an equipment IP of a counterfeit MAC which is to be changed.
Target MAC Address 411 enters 0x000000000000.
Target IP Address 412 enters an IP information which is identical to the Sender IP Address, generates an ARP request packet and transmits a concerned packet to a local network.

Subsequently, a communication method which can be realized by changing a real MAC address into a counterfeit MAC address in a network for neutralizing an ARP spoofing attack will be explained in detail with referring to FIG. 4.

Figure 4:
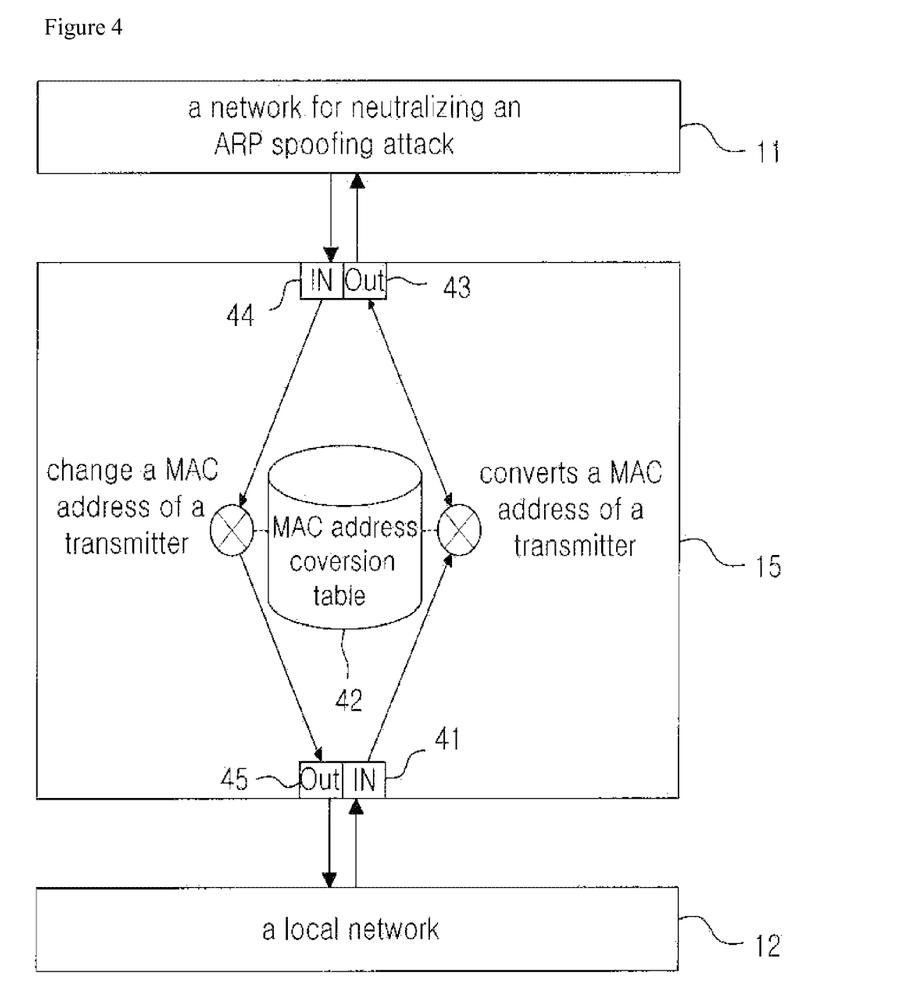
FIG. 4 is a schematic diagram showing a state in which communications can be realized by changing a real MAC address into a counterfeit MAC address among a network device, a terminal or a server for neutralizing an ARP spoofing attack.

FIG. 4 is a schematic diagram showing a state in which communications can be realized by changing a real MAC address into a counterfeit MAC address between a server 20 or a network devices and a terminal device 19 of the network 11 for neutralizing an ARP spoofing attack and the system 15 for neutralizing an ARP spoofing attack.

As illustrated in FIG. 4, in connection with a Destination MAC Address 401 of a packet having the Ethernet header 31 among the traffic inputted to an input (In) port 401 from the local network 12, the system 15 for neutralizing an ARP spoofing attack changes the Destination MAC Address 401 into real MAC address of an equipment matching with a counterfeit MAC address of a MAC address conversion table 42 in order to change a counterfeit MAC address into the real MAC address of an equipment. Then, the changed address is transmitted to an output (Out) port 43 connected to the network 11 for neutralizing an ARP spoofing attack. Further, in connection with a Source MAC Address 402 of a packet having the Ethernet header 31 among the traffic inputted from the network 11 for neutralizing an ARP spoofing attack and the terminal device to an input (In) port 44, the system 15 for neutralizing an ARP spoofing attack changes the Source MAC Address 402 into a counterfeit MAC address of an equipment which matches with a real MAC address of a MAC address conversion table 42 and is now currently used in order to change a real MAC address into the counterfeit MAC address. Then, the changed address is transmitted to an output (Out) port 45 connected to the network 12.

Therefore, as described above, the equipments and the terminals of the local network 12 can execute communication based on the counterfeit MAC address of the MAC address conversion table 42 according to the processes of the system 15 for neutralizing an ARP spoofing attack.

Figure 5:
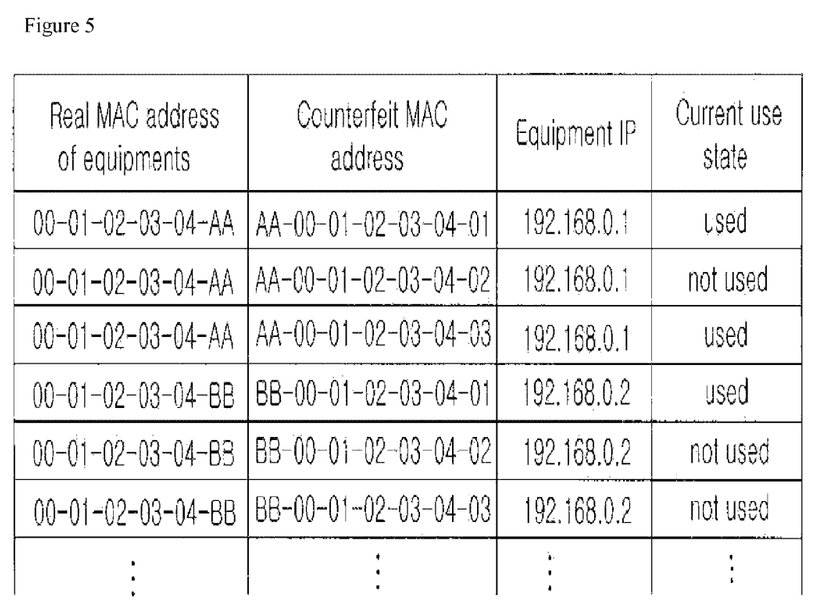
FIG. 5 is a diagram showing an example of a MAC address allocation table which is referred to for allocation and change of a counterfeit MAC address.

FIG. 5 is a diagram showing an example of a MAC address allocation table 42 which is referred to for allocation and change of a counterfeit MAC address.

As illustrated in FIG. 5, in a MAC address allocation table for allocation of a counterfeit MAC address, three counterfeit addresses are randomly created for each of real MAC addresses of equipments without overlapping, and in connection with each of the real MAC addresses of equipments, the MAC address allocation table is organized by selecting a counterfeit address which can use a counterfeit MAC address which is initially created as a counterfeit MAC address which is currently used among available counterfeit MAC addresses.

In the MAC address allocation (conversion) table which is organized as such, if it is detected that an ARP spoofing attack is generated in a counterfeit MAC address which is currently used, three counterfeit MAC addresses are arranged as a ring shape according to a Round Robin method and a counterfeit MAC address having 2 is changed into a counterfeit MAC address which is currently used if a MAC address in which an ARP spoofing attack is detected is a counterfeit MAC address having 1.

Further, if it is detected that an ARP spoofing attack is generated in a counterfeit MAC address having 2, a counterfeit MAC address having 3 is changed into a counterfeit MAC address which is currently used. If it is detected that an ARP spoofing attack is generated in a counterfeit MAC address having 3, a counterfeit MAC address having 1 is changed into a counterfeit MAC address which is currently used. Thereby, an ARP spoofing attack can be neutralized.

Figure 6:
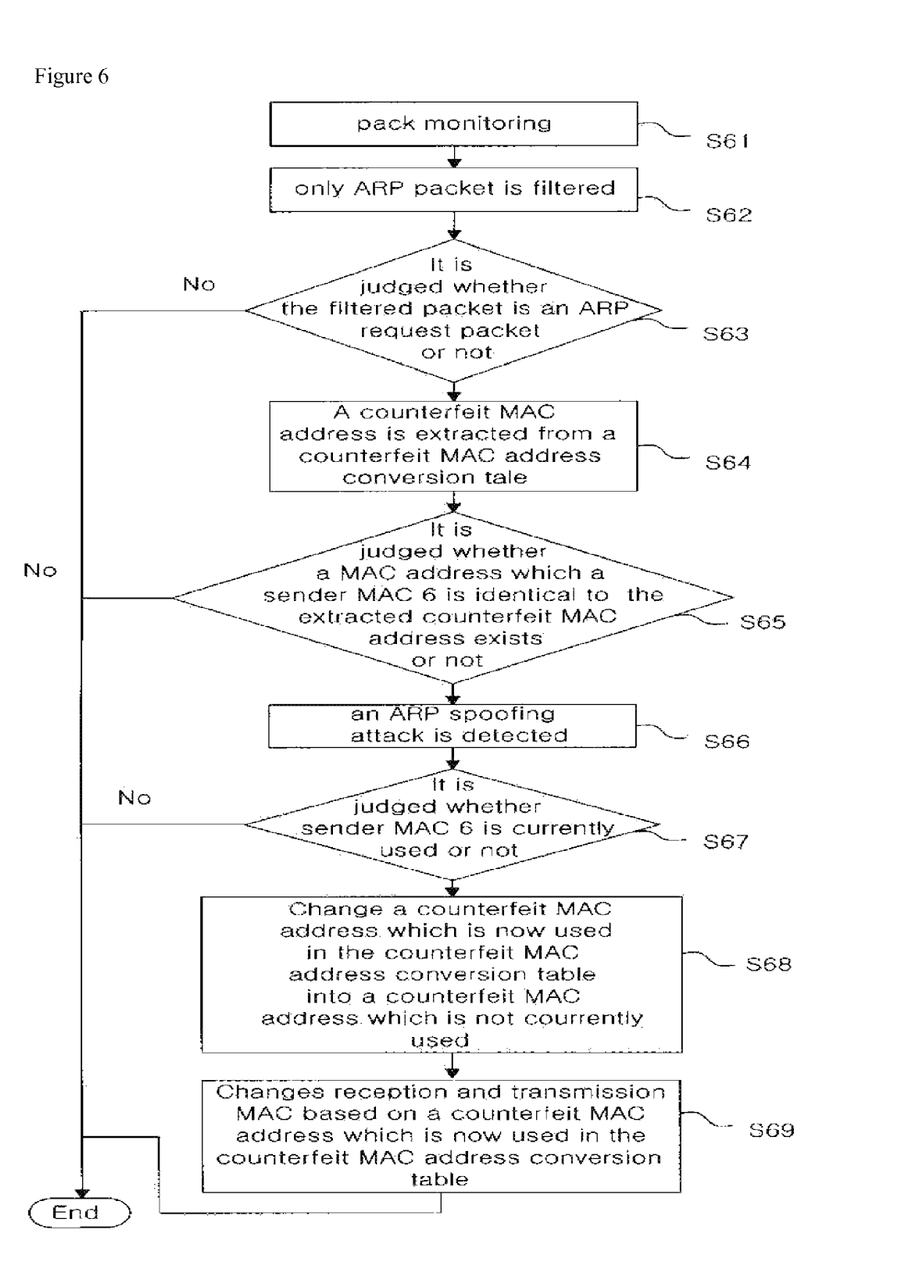
FIG. 6 is a flow chart showing whole procedures of a method for neutralizing an ARP spoofing attack by using a counterfeit MAC address according to the present invention.

FIG. 6 is a flow chart showing whole procedures of a method for neutralizing an ARP spoofing attack by using a counterfeit MAC address according to the present invention.

As illustrated in FIG. 6, a method for neutralizing an ARP spoofing attack by using a counterfeit MAC address according to the present invention monitoring packets transmitted in a network (step S61), filters only ARP packets of the monitored packets (step S62), and judges whether the filtered packet is an ARP request packet or not (step S63).

If a judgement result is "YES", that is, if the filtered packet is an ARP request packet, a counterfeit MAC address is extracted from the counterfeit MAC address conversion table (step S64).

Then, judges whether a MAC address which a Sender MAC address is identical to the extracted counterfeit MAC address exists or not (step S65).

If a judgement result is "YES", that is, if same MAC address exists, detects that an ARP spoofing attack is generated (step S66), and it is judged whether Sender MAC is currently used or not (step S67).

If a judgement result is "YES", that is, if Sender MAC is currently used, a counterfeit MAC address which is now used in the counterfeit MAC address conversion table into a counterfeit MAC address which is not currently used (step S68).

Then, reception and transmission MAC is changed based on a counterfeit MAC address which is now used in the counterfeit MAC address conversion table (step S69).

Further, if a judgement result is "NO" (step S63, S65, S67), it is judged that an ARP spoofing attack is not generated and thus the whole process is terminated.

Therefore, through the processes described as above, an ARP spoofing attack is detected in a real time manner, and a vicious ARP spoofing attack can be neutralized effectively by changing a counterfeit MAC address which is currently used into another address if an ARP spoofing attack is detected.

Next, a second embodiment of a method for neutralizing an ARP spoofing attack by using a counterfeit MAC address according to the present invention will be explained in detail with referring to FIG. 7.

Here, for simplifications of explanation, the portions which are identical to those of the first embodiment are denoted by same symbols and the explanation thereof are omitted.

As illustrated in FIG. 7, the second embodiment of a method for neutralizing an ARP spoofing attack by using a counterfeit MAC address according to the present invention is different from the first embodiment in that the local network 12 is directly connected to the Internet, and allocation and change of a counterfeit MAC address for detection of an ARP spoofing attack and neutralization of an ARP spoofing attack are executed by using a SW (software) 17 for neutralizing an ARP spoofing attack embedded in a terminal device 16 for neutralizing an ARP spoofing attack instead of the system 15 for neutralizing an ARP spoofing attack in the first embodiment.

That is, unlike the system 15 for neutralizing an ARP spoofing attack in the first embodiment, the terminal device 16 for neutralizing an ARP spoofing attack in the second embodiment is connected to the local network 12 and monitors all traffics generated and transmitted between every terminal such as a subscriber PC 21 existing in the local network 12 and the terminal device 16 for neutralizing an ARP spoofing attack. Further, if an ARP spoofing attack is detected against the terminal device 16 from the subscriber PC 21, as described above, a counterfeit MAC address which is currently used changed into another address which is not used based on the counterfeit MAC address conversion table, and communications are executed by using the changed address.

Further, these processes are executed by the SW (software) 17 for neutralizing an ARP spoofing attack embedded in the terminal device 16, and the specific processes are identical to those of the first embodiment.

That is, the SW (software) 17 for neutralizing an ARP spoofing attack monitors all packets generated and received between the terminal device 16 and the local network 17 and thus an ARP spoofing attack which is targeted to terminal device 16 can be detected in the subscriber PC 21 and the like the local network 12.

Here, when detecting an ARP spoofing attack, if an ARP request packet in which a MAC address of a transmitter is identical to the MAC address of the terminal device 16 is collected among all ARP request packets collected via a network interface connected to the local network 12, it is recognized that an ARP spoofing attack is generated.

Thereafter, if it is recognized that an ARP spoofing attack is generated, the MAC address of the terminal device 16 which is currently used is changed into a counterfeit MAC address which is not currently used with referring to a MAC address conversion table having a real MAC address of an equipment, and a plurality of counterfeit MAC addresses corresponding to the real MAC address of the equipment in order to change a MAC address of the terminal device 16 which is to be protected from an ARP spoofing attack into a counterfeit address.

Then, all reception and transmission packets are transmitted to the changed address of the local network 12.

Therefore, according to the second embodiment of the present invention, it is also possible to realize a method for neutralizing an ARP spoofing attack by using a counterfeit MAC address through software.

Further, in the second embodiment, the terminal device 16 including the SW (software) 17 for neutralizing an ARP spoofing attack is illustrated as a separate external device, but the SW (software) 17 for neutralizing an ARP spoofing attack, for example, can be realized as a client program embedded in the subscriber PC 21.

As described above, a method for neutralizing an ARP spoofing attack by using a counterfeit MAC address according to the present invention is explained in detail while taking the embodiments of the present invention as examples, but the present invention is not limited to the embodiments and the detailed explanation of the present invention.

That is, in the first embodiment, the system 15 for neutralizing an ARP spoofing attack is arranged, but if a series of processes as described above can be executed, the system 15 can also be implemented as an independent system of a hardware type like the first embodiment or can be provided as a separate external device or a software such as an application program embedded in a server or a client like the second embodiment.

Here, if the system 15 is provided as a software type as described above, the present invention is provided as a recording medium where a program for executing a series of processes as described above is recorded or can be provided as a download program which can be obtained via downloading in the Internet. Therefore, the system 15 can be provided as various kinds of types if necessary.

Therefore, the present invention is not limited only to the detailed explanation of the present invention as described above, and it is natural that according to design and diverse demands, various modifications and changes can be made by the person having a common knowledge in the related art within the scope of the claims of the present invention without deviating from the spirit and the scope of the present invention.

INDUSTRIAL APPLICABILITY

According to the present invention, since a MAC address of an equipment for neutralizing an ARP spoofing attack is allocated and changed into a counterfeit MAC address, there is an effect that initially, it is possible to protect a concerned equipment from an ARP spoofing attack without taking countermeasures against an ARP spoofing attacker (for example, removal of an ARP spoofing malicious code by using a vaccine, power OFF of a attack system and etc.).

Further, a method for executing communications in a local network by using a counterfeit MAC method of a system according to the present invention can be changed or improved as various security technologies on a local network.

The invention claimed is:

1. A system for neutralizing an ARP spoofing attack, the system comprising:
   a plurality of local networks each respectively including a plurality of network devices,
   wherein the plurality of network devices in a first local network among the plurality of local networks includes a general network device that is a subscriber PC, terminal equipment, and a switch;
   a neutralizing network configured to neutralize an ARP spoofing attack and including a network device that is a router, terminal equipment, a server, and a switch; and
   an interconnecting device connected between the first local network and the neutralizing network, and including a MAC address conversion table,
   the MAC address conversion table configured to store respective real MAC addresses of the general network device, the terminal equipment of the first local network, and the server, and counterfeit MAC addresses corresponding to the real MAC addresses,
   wherein the counterfeit MAC addresses in the MAC address conversion table include a first counterfeit MAC address and a second counterfeit MAC address, and are stored in a ring shape arrangement, and
   wherein the interconnecting device is configured to:
   change at least one of the real MAC addresses into the first counterfeit MAC address,
   detect when the ARP spoofing attack is executed by monitoring an ARP request packet,
   change the first counterfeit MAC address into the second counterfeit MAC address when the interconnecting device detects that an ARP spoofing attack is executed,
   wherein the changing of the first counterfeit MAC address into the second counterfeit MAC address is performed in a round robin manner based on the ring shape arrangement of the counterfeit MAC addresses stored in the MAC address conversion table, and
   subsequently, broadcast the second counterfeit MAC address to the network devices in the first local network, and change reception and transmission packets of the first local network by using the second counterfeit MAC address.

2. The system for neutralizing an ARP spoofing attack set forth in claim 1, wherein the interconnecting device comprises:
   a detecting device configured to detect whether an ARP spoofing attack against the general network device or the server is executed, wherein the detecting device is connected between the first local network and the neutralizing network so that packets generated or received by the general network device can pass through the detecting device; and
   a transmission unit configured to transmit and receive the reception and transmission packets of the first local network using the counterfeit MAC addresses stored in the MAC address conversion table.

3. The system for neutralizing an ARP spoofing attack set forth in claim 2, wherein the detecting device is further configured to:
   recognize that an ARP spoofing attack is executed when an ARP request packet including a MAC address of a transmitter that is identical to the MAC address of the general network device, the terminal equipment of the first local network, or the server, is collected from the ARP request packet collected via a network interface of the detecting device that is connected to the first local network; and
   change the real MAC address that is currently being used into the first counterfeit MAC address based on the MAC address conversion table.

4. A system for neutralizing an ARP spoofing attack comprising:
   a plurality of local networks each respectively including a plurality of network devices,
   wherein the plurality of network devices in a first local network among the plurality of local networks includes a general network device that is a subscriber PC, terminal equipment, and a switch;
   a terminal device connected to the first local network and configured to neutralize an ARP spoofing attack,
   the terminal device including a MAC address conversion table configured to store respective real MAC addresses of the general network device, the terminal equipment, counterfeit MAC addresses corresponding to the real MAC addresses, and embedded software,
   wherein the counterfeit MAC addresses in the MAC address conversion table include a first counterfeit MAC address and a second counterfeit MAC address, and are stored in a ring shape arrangement, and
   wherein the embedded software in the terminal device is configured to:
   change at least one of the real MAC addresses of the general network device and the terminal equipment into the first counterfeit MAC address,
   detect when an ARP spoofing attack is executed by monitoring an ARP request packet,
   change the first counterfeit MAC address into the second counterfeit MAC address when the terminal device detects that the ARP spoofing attack is executed,
   wherein the changing of the first counterfeit MAC address into the second counterfeit MAC address is performed in a round robin manner based on the ring shape arrangement of the counterfeit MAC addresses stored in the MAC address conversion table, and subsequently, broadcast the second counterfeit MAC address to the network devices in the first local network, and change reception and transmission packets of the first local network by using the second counterfeit MAC address.

5. The system for neutralizing an ARP spoofing attack set forth in claim 4, wherein the embedded software in the terminal device is further configured to:

recognize that an ARP spoofing attack is executed when an ARP request packet including a MAC address of the terminal device for that is identical to the MAC address of a transmitter is collected from the ARP request packet collected via a network interface of the terminal device that is connected to the first local network.

6. A method for neutralizing an ARP spoofing attack in a system, the system including a plurality of local networks, each of the plurality of local networks respectively including a plurality of network devices and a plurality of terminal devices, the plurality of network devices in a first local network among the plurality of local networks including a general network device that is a subscriber PC, terminal equipment, and a switch, the plurality of terminal devices in the first local network including a first terminal device, the method comprising, allocating a counterfeit MAC address to the first network device or a the first terminal device for neutralizing an ARP spoofing attack;

storing, in a MAC address conversion table, respective real MAC addresses of the general network device and the terminal equipment, and counterfeit MAC addresses corresponding to the real MAC addresses, wherein the counterfeit MAC addresses in the MAC address conversion table include a first counterfeit MAC address and a second counterfeit MAC address, and are stored in a ring shape arrangement;

changing at least one of the MAC addresses of the general network device and the terminal equipment into the first counterfeit MAC address;

monitoring whether an ARP spoofing attack is executed by monitoring an ARP request packet or not, packet;

changing the first counterfeit MAC address into the second counterfeit MAC address when the ARP spoofing attack is detected at the monitoring step, wherein the changing of the first counterfeit MAC address into the second counterfeit MAC address is performed in a round robin manner based on the ring shape arrangement of the counterfeit MAC addresses stored in the MAC address conversion table;

subsequently, broadcasting the second counterfeit MAC address to the network devices and the terminal devices in the local networks, and changing MAC addresses of reception and transmission packets into the second counterfeit MAC address; and executing communications based on the second counterfeit MAC address.

7. The method for neutralizing an ARP spoofing attack set forth in claim 6, wherein the step of monitoring whether an ARP spoofing attack is executed includes:

filtering and collecting only ARP request packets for which an OP code value is 1 among packets received from the plurality of local networks;

judging whether a concerned MAC address is identical to a Sender MAC address of a header information of the ARP request packet; and judging that an ARP spoofing attack for the concerned MAC address has not been executed when the ARP request packet is regarded as an ARP request packet generated in a real network device or a server, and judging that an ARP spoofing attack has been executed when the ARP request packet is from a specific terminal of a network for counterfeiting an ARP cache table for the plurality of network devices, or from a switch included in the plurality of network devices.

8. The method for neutralizing an ARP spoofing attack set forth in claim 6, wherein the step of changing the first counterfeit MAC address comprises:

selecting the second counterfeit MAC address that is not currently used based on the MAC address conversion table; and selecting the MAC addresses corresponding to the real MAC addresses the network devices and the terminal devices in the local networks, when the ARP spoofing attack is detected.

9. The method for neutralizing an ARP spoofing attack set forth in claim 6, wherein the step of broadcasting the second counterfeit MAC address includes:

generating an ARP request packet indicating that the first counterfeit MAC address which is attacked is changed; and broadcasting the generated ARP request packet to the network devices and the terminal devices in the local networks, the generated ARP request packet indicating the second counterfeit MAC address.

10. The method for neutralizing an ARP spoofing attack set forth in claim 6, wherein the step of executing communications includes:

changing MAC addresses of packets received by the network devices and the terminal devices in the local networks, into the real MAC addresses of the network devices and the terminal devices in the local networks, which are ready to receive packets based on the MAC address conversion table so that the network devices and the terminal devices in the local networks can communicate using the corresponding counterfeit MAC address; and changing the real MAC addresses of packets transmitted from the network devices and the terminal devices in the local networks, into the corresponding counterfeit MAC addresses of the network devices and the terminal devices in the local networks, which are ready to transmit based on the MAC address conversion table.

* * * * *